(No Model.)
G. T. WARWICK.
TRICYCLE.
No. 309,325. Patented Dec. 16, 1884.
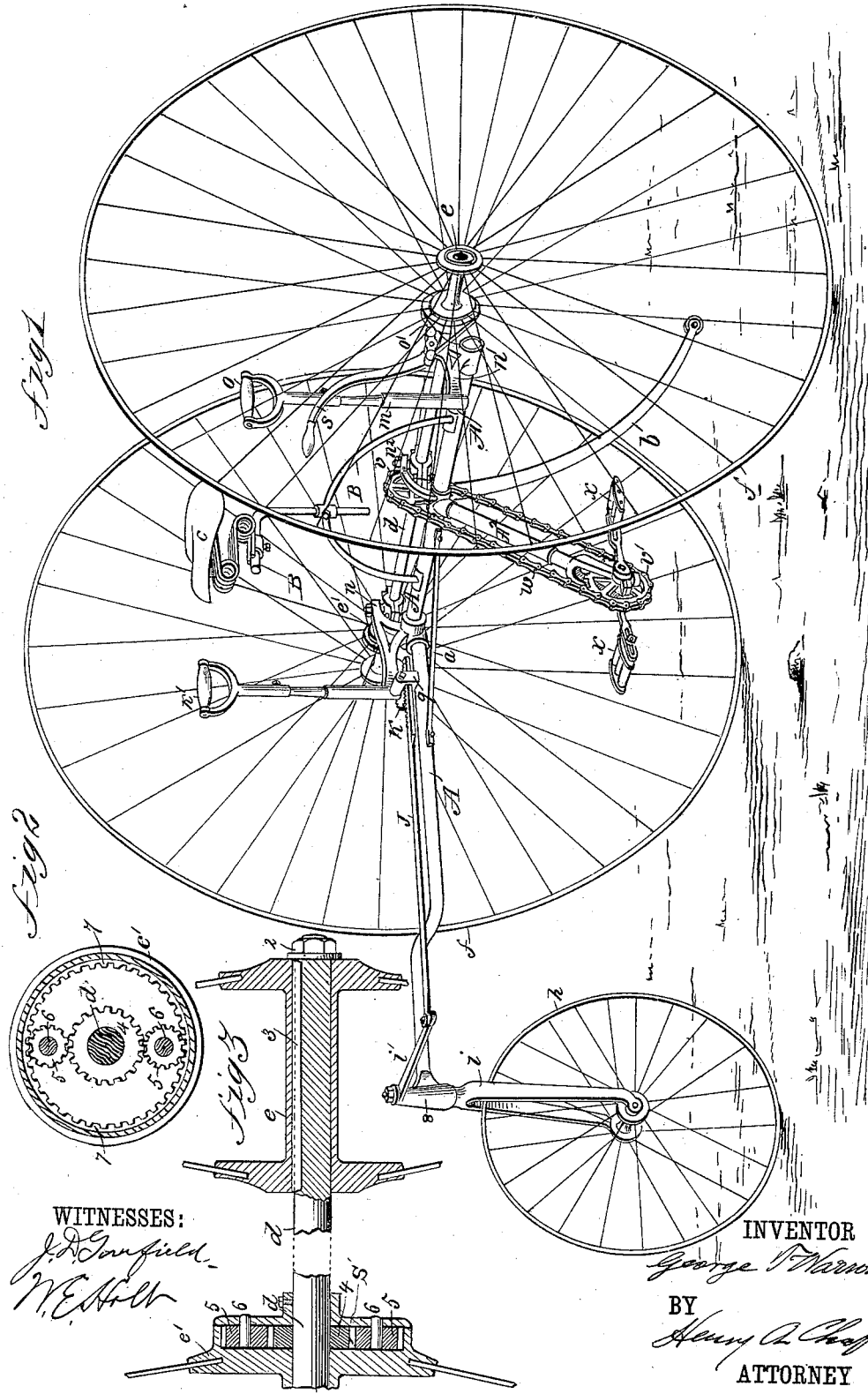
WITNESSES:
INVENTOR
George T Warwick
BY
ATTORNEY United States Patent Office.

GEORGE T. WARWICK, OF SPRINGFIELD, MASSACHUSETTS.

TRICYCLE.

SPECIFICATION forming part of Letters Patent No. 309,325, dated December 16, 1884.

Application filed April 17, 1884. (No model.)

*To all whom it may concern:*

Be it known that I, GEORGE T. WARWICK, a citizen of England, residing at Springfield, in the county of Hampden and State of Massachusetts, have invented new and useful Improvements in Tricycles, of which the following is a specification.

This invention relates to improvements in tricycles; and it consists in certain details of construction, as hereinafter pointed out and claimed.

In the drawings forming part of this specification, Figure 1 illustrates a tricycle constructed according to my invention. Figs. 2 and 3 are detail views.

In the drawings, A is the frame of the machine, of tubular construction, having a part running parallel with the axle $d$, and a branch extending therefrom at a point near the side of one of the wheels $f$, at the extreme end of which is supported the steering-wheel $h$, which is by said branch supported in such a position that it and the wheel $f$ behind it follow substantially the same track.

On the top of the support or fork $i$ is a socket, 8, in which the end of the said branch of the frame A is pivoted in the ordinary way, whereby the said fork is permitted to have an oscillating motion on the end of said branch. An arm, $i'$, is secured to the upper end of the socket 8, to the end of which is pivoted the steering-rod J, which has a rack on one edge near the rear end thereof, with which a pinion, K, engages, said pinion being fixed on the lower end of a rod, to which the steering-handle K' is secured, so that by turning the latter the steering-wheel $h$ is operated in the usual way. The rack and pinion and the aforesaid steering-handle rod are supported on bracket $n$, and by a connection, 9, with the frame. A strengthening-brace, $a$, is secured to the above-described two main parts of frame A, across the corner angle thereof, as shown. The above-named bracket $n$ is secured to the angle-connection of the frame, and, extending over the axle $d$, has suspended thereon one of the axle-boxes near the hub $e'$ of wheel $f$. The opposite end of that part of frame A parallel with the axle has the bracket $n'$ thereon, which likewise supports an axle-box near to hub $e$, and also the support $m$ to the supporting-handle $o$, as well as the brake-lever $s$, which is connected in the usual manner with the brake-band $o'$, which passes around the rear end of hub $e$.

Centrally between the wheels $f\,f$ on frame A is connected the crank and sprocket-wheel arm $A^2$ to the frame. Said arm is made bifurcated at its lower end to receive the sprocket-wheel $v'$. Suitable shaft-boxes are provided on the extremities of the two arms thus formed on arm $A^2$, in which runs a shaft, on which the sprocket-wheel $v'$ is fixed, and to said shaft are fixed treadle-arms carrying treadles $x\,x$ thereon. A sprocket-wheel, $v$, is secured on the axle $d$ in a line with wheel $v'$, and the driving-chain $w$ connects the said two wheels. A bracket, $n^2$, from the frame A, near arm $A^2$, supports an axle-box near the sprocket-wheel on the axle. The seat-frame B is secured to frame A and bears the seat $c$ on its upper part. The parts of frame B are adjustable, as shown, so that seat $c$ may be raised or lowered, or be moved forward or back. The usual safety-arm, $b$, is extended rearward from the center of frame A, to guard against the possible backward tipping of the machine. The hub $e$ of one of wheels $f$ is keyed to the axle by key 3, as shown in detail in Fig. 3, and secured thereon by a nut, 2, whereby said wheel is forced to rotate with the axle when the latter is operated by the rider through the treadles and sprocket-wheel and chain-connection therewith, above described.

The opposite wheel $f$ is permitted to rotate on the axle, but is connected with the axle $d$ by a series of gears, as shown in Figs. 2 and 3, as follows: The inner end of the hub $e'$ is chambered out, and has formed on its inside circular face an internal gear, 7. A pinion, 4, is placed on the axle $d$, so as to turn with some friction thereon, and two intermediate pinions, 5, run on studs 6, which have bearings in disk $s'$, which is secured to the shaft by a set-screw or otherwise. The pinions 5 engage with pinion 4 and with the internal gear, 7, whereby the wheel of which $e'$ is the hub must rotate with the axle $d$, but is permitted, when the machine is running around curves, to have a differential speed as compared with the wheel which is rigidly connected with the axle.

The operation of the machine is easily understood by the drawings and the foregoing detailed description of its construction, whereby it is seen that there are combined in this machine devices forming a tricycle in which both of the large wheels are driving-wheels, operated by a single chain, and that the driving-power is applied centrally between them and from directly beneath the rider, whereby much of the usual spring of the crank-shaft is avoided and a firmer and more unyielding construction is obtained, which conduces to greater ease in working the machine, and consequently greater speed. Furthermore, the steering-wheel being set off to run in the track of one of the driving-wheels, and the axle driving mechanism all being centrally located beneath the rider, and not extending to the right and left, as usual in tricycles, the front of the machine is left open and clear, with nothing to interfere with the convenient mounting and dismounting of the rider, and the parts of the machine are by such construction so much reduced in number that it is made much lighter than usual.

What I claim as my invention is—

In combination, the axle $d$, having one driving-wheel and the pinion 4 keyed thereto, the wheel-hub $e'$, having the internal gear, 7, the pinions 5, carried by disk $s'$, and driving mechanism, substantially as described, located and connected with said axle midway between its ends, substantially as set forth.

GEO. T. WARWICK.

Witnesses:
  H. A. CHAPIN,
  J. D. GARFIELD.